Dec. 10, 1946.  K. RATH  2,412,424
PHOTOELECTRIC CONTROL DEVICE FOR CAMERA DIAPHRAGMS
Filed May 12, 1944
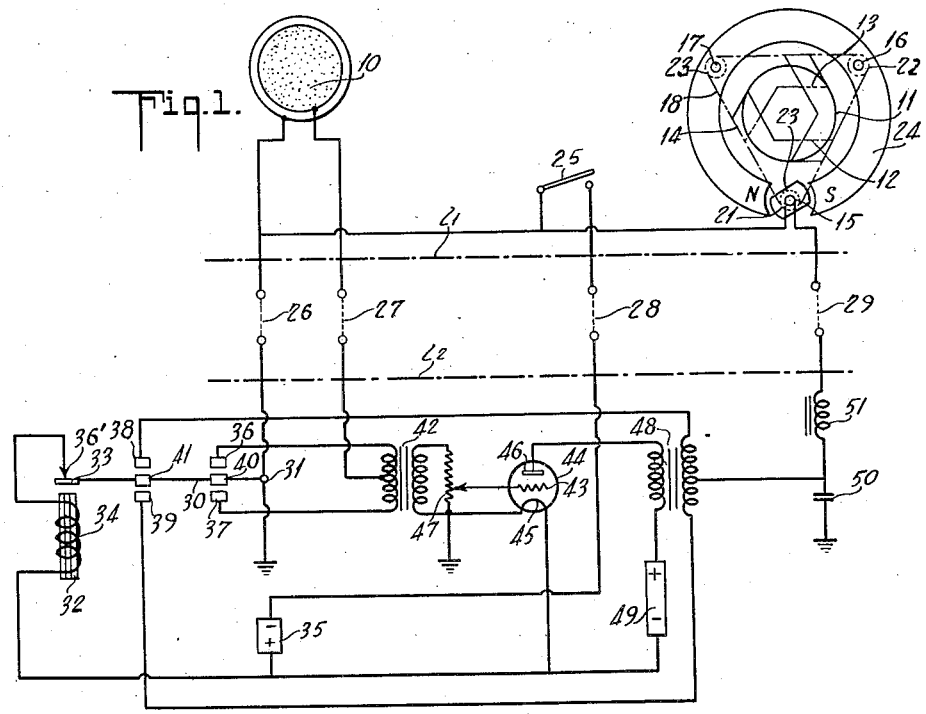
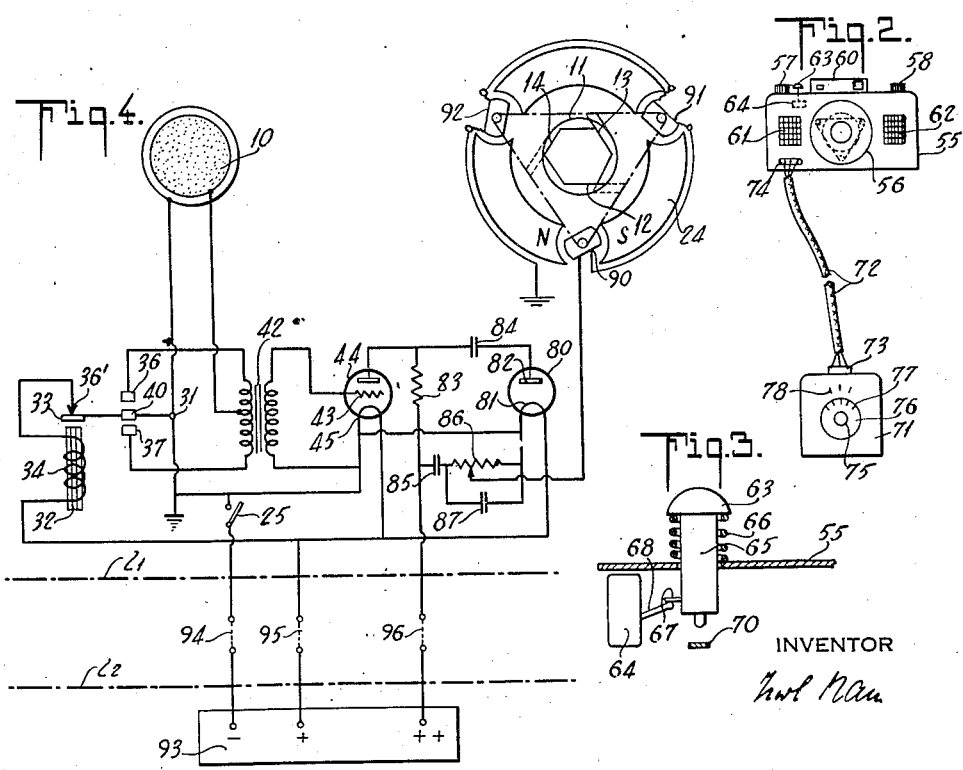
INVENTOR Patented Dec. 10, 1946

2,412,424

UNITED STATES PATENT OFFICE 2,412,424

PHOTOELECTRIC CONTROL DEVICE FOR CAMERA DIAPHRAGMS

Karl Rath, New York, N. Y.

Application May 12, 1944, Serial No. 535,242

6 Claims. (Cl. 95—64)

1

The present invention relates to automatic exposure control for portable photographic hand cameras of the type comprising a photo-electric device capable of producing a varying response current in proportion to the brightness of a scene or object to be photographed, said current serving to operate an adjustable exposure control means such as an iris diaphragm in such a manner as to result in a correct exposure for a given scene brightness and other exposure controlling factors including shutter speed or exposure time and emulsion sensitivity.

Automatic exposure control devices of the above type heretofore known in the art have been subject to great difficulties due to the small current or electrical power supplied by the standard photo-electric cell, such as the well-known and commonly used self-generating or photovoltaic cells. The use of amplifying devices, on the other hand, has been prohibitive in most cases due to the added weight and bulk which may exceed those of the camera itself, especially in the case of the now popular miniature cameras.

Accordingly, an object of the invention is to provide an improved amplifier suitable for use in connection with a photovoltaic cell of known type which is both small in size and simple in design and capable of producing an amplified output current sufficient for directly controlling an iris diaphragm or other exposure control means in a substantially automatic manner.

Another object is to provide a camera-amplifier combination for automatic exposure control especially suitable for use with small portable hand cameras to afford a fully automatic control of the exposure under varying scene or object brightness conditions.

Other objects and aspects of the invention will be in part pointed out and in part become apparent from the following detailed description taken in reference to the accompanying drawing illustrating by way of example practical embodiments of the invention and forming part of this specification. In the drawing:

Figure 1 is a diagram illustrating one form of automatic exposure control system embodying the principles of the invention; Figure 2 shows a camera and exposure control device arranged in accordance with the invention; Figure 3 is a fragmentary detail view of Figure 2 showing the shutter release and control switch for the exposure adjustment; and Figure 4 is a diagram similar to Figure 1 illustrating a modified form of the invention.

2

Like reference numerals identify like parts in the different views of the drawing.

Referring to Figure 1, I have shown at 10 a photo-electric cell, preferably a cell of the self-generating dry-disc or photovoltaic type, permanently mounted upon a camera and adapted to produce a response current proportional to the brightness of a scene or object to be photographed if the camera, in the operative position, is properly aimed towards said scene, as indicated by a view finder of any known construction.

The camera which may be of any known type, in the example shown, comprises a lens 11 provided with an iris diaphragm mechanism for controlling the amount of light collected from the scene to be photographed and impinged upon the sensitive plate or film in the focal in a manner well known. The iris diaphragm is of special construction comprising a plurality of adjustable leaves, three leaves 12, 13 and 14 having been shown in the drawing, rotatably mounted by means of shafts 15, 16 and 17 all connected for simultaneous operation through a pulley drive arrangement. The latter comprises a silk or nylon thread 18 or the like, and pulleys 20, 21 and 22 mounted upon the shafts 15, 16 and 17, respectively. Shaft 15 is arranged for rotation by a magnetic moving coil 23 mounted within an air gap of an annular permanent magnet 24 suitably arranged upon and encircling the lens 11. By energizing the coil 23 which is properly balanced by counter-torque springs also serving as current conducting leads, the coil will be subjected to a torque due to the action of the magnetic field between the poles indicated at N and S. Consequently, the diaphragm leaves 12, 13 and 14 will be rotated to varying angles, whereby to vary the central exposed area and resulting in a corresponding control of the light flux entering the lens 11.

The electric iris control shown in Figure 1 is by way of example only, various modifications thereof being obvious and well known to those skilled in the art. Thus, in place of the pulley drive arrangement, each leaf 12, 13 and 14 may be driven by a separate moving coil mounted in additional air gaps of the magnet 24, said coils being energized by the actuating current in series or in parallel, or in any other suitable manner, as shown more clearly in Figure 4 to be described hereinafter.

Item 25 represents a switch normally in open-circuit position and synchronized with the operation of the shutter release of the camera in such a manner as to become closed just prior to and during an exposure by the operation of a shutter release knob or button, in a manner more clearly understood from and described in the following.

All the parts thus far described are permanently mounted upon the body of a camera, as indicated by the dot-dash separating lines in the drawing. The parts above line $l_1$ are combined with the camera, while the parts shown below line $l_2$ are combined to form a separate converter or amplifying unit connected to the camera through a flexible, elongated member such as a cord comprising a number of insulated wires or leads 26, 27, 28 and 29, to be further described in the following.

The amplifier may be of any suitable type, but since the potential supplied by the photovoltaic cell 10 which preferably is of the known selenium or cuprous oxide type, is normally too low for directly exciting the grid of a standard thermionic amplifier tube, there is provided, in the example illustrated, a converter system comprising means to periodically interrupt the photo-electric current by means of an electromagnetic vibrator to produce an alternating current of suitable frequency. The latter may advantageously be from 60 to 1000 cycles and can be easily stepped up in voltage, amplified by an audio frequency amplifier, and rectified to obtain a sufficiently strengthened output current suitable for operating the exposure control such as an electrically adjustable iris diaphragm described hereinabove.

There is provided for this purpose in the embodiment of Figure 1, a synchronous vibrator and rectifier, comprising a reed 30 fixedly secured at 31 and vibrated by an electromagnetic interrupter device comprising a magnet core 32 arranged opposite to an armature 33 mounted at the free end of the reed 30 and carrying an energizing or operating winding 34. The latter is connected to a low voltage battery such as a dry cell 35 by way of the switch 25 associated with the shutter release of the camera, the reed 30 and contact 36' arranged to cooperate with the reed 30 or armature 33. Upon closing the switch 25, the armature 33 starts to vibrate at a frequency determined by the resiliency and characteristics of the reed 30 as well as the adjustment of contact 36', whereby to alternately open and close the two pairs of contacts 36—37 and 38—39, the former being located at opposite sides of a contact 40 mounted upon the reed 30, and the latter being located at opposite sides of a contact 41 also mounted upon the reed 30.

The photovoltaic cell 10 is connected to the reed 30 on the one hand, and to the center tap of the primary winding of a voltage step-up transformer 42, on the other hand, the opposite ends of said winding being connected to the contacts 36 and 37, respectively. On account of the alternate closing and opening of contacts 36 and 37, current will first flow in one direction through one half of the transformer winding, and then in the opposite direction through the other half of the transformer winding; or in other words, the direct current generated by the photovoltaic cell will be transformed into alternating current having a frequency determined by the vibrating frequency of the reed and having an amplitude varying according to the intensity of the photo-electric current or, in turn, the intensity of the light rays affecting the sensitive surface of the photo-electric cell, which light intensity varies in proportion to the brightness of the object or scene to be photographed.

The alternating current produced by the vibrator action is stepped up in the secondary winding of the transformer 42 to a voltage sufficient to excite the grid 43 of a thermionic audio frequency amplifier tube 44 of known construction having a heated cathode or filament 45 and an anode or plate 46. A variable potentiometer resistance 47, interposed between the output circuit of the transformer and the grid circuit of the amplifier, serves as a volume control for adjusting the amplitude of the output current. The latter, being an alternating current of increased amplitude in accordance with the amplification or gain of the tube 44, is rectified to produce a direct current suitable for energizing the actuating coil 23 of the iris mechanism.

The low voltage source 35 serves also as A-battery to heat the filament 45 of the amplifier 44, and is connected and disconnected by switch 25 together with the vibrator winding 34. The plate circuit of the amplifier tube includes the primary of a further audio frequency coupling transformer 48 and a high voltage or B-battery 49 for supplying the anode or space current of the tube. The rectifier in the example shown is of the mechanical synchronous type comprising the contacts 38 and 39 of the vibrator, which contacts are connected to the opposite ends of the secondary winding of the transformer 48. Accordingly, a rectified or direct current flows through the circuit connecting the center tap of the secondary winding of transformer 48 with the reed 30 or contact 41 connected to ground represented by the metallic support or chassis of the device such as the metal body of the camera. This output circuit includes the moving coil 23 of the iris control as well as a by-pass condenser 50 to ground and a series inductance 51 constituting a filter for smoothing the ripples or pulsations in the rectified current.

The volume control resistance 47 or an equivalent gain control may be utilized to consider varying shutter speeds, and for this purpose may be directly connected with the shutter speed adjustment of the camera. Alternatively, it may be provided with a shutter speed adjusting scale in a manner well understood. In the latter case, varying film speeds may be additionally considered by mounting the sliding contact of resistance 47 upon an adjustable scale member carrying a film speed scale, the latter cooperating with a fixed shutter speed scale, or vice versa. By adjusting the scale member so that a chosen shutter speed is opposite the speed number of the film used, both factors may be considered in the final aperture control or iris diaphragm adjustment. An arrangement of this type is shown in Figure 2 described in the following.

In the latter, there is shown a camera 55 of any suitable construction, such as a miniature camera using 35-millimeter moving picture film and comprising in a known manner a shutter 56 encircling the lens of the camera and including an electrically controlled iris diaphragm such as of the type shown in Figure 1. Numerals 57 and 58 represent the film and shutter winding knobs, numeral 60 is a combined view and range finder, preferably synchronized with the lens focusing mechanism, and items 61 and 62 indicate a pair of barrier layer photovoltaic cells of the known dry-disc selenium or cuprous oxide type suitably mounted upon the front panel of a camera and provided with light baffles to restrict the view or acceptance angle to correspond with the picture angle of the camera, in the manner well known in the art.

The outputs of both photo-electric cells may be combined to increase the resultant response current, or the cells may have different acceptance angles and their outputs combined in a manner to do justice to preferred part of the object or scene, to obtain a desired pictorial value or effect in the final print in the manner more clearly described in my co-pending patent application Serial No. 510,110, filed November 30, 1943, and entitled "Photo-electric exposure determining device." Item 63 represents a shutter release knob or button arranged to operate a snap switch 64 corresponding to switch 25 in Figure 1, as more clearly shown in Figure 3.

In the latter, the release button 63 operating the plunger 65 is normally urged into the position shown by a spring 66 and has a nose or projection 67 engaging and operating a toggle 68 forming part of the switch 64, upon initially pressing the button towards the camera body 55. Continued movement of button 63 will result in the tripping or release of the shutter by engagement with a shutter release lever or the like indicated at 70. Release of button 63, after an exposure has been completed, will result in a return to its starting position by the action of spring 66, whereby to cause operation of the switch 64 in the reverse direction and resulting in opening and interruption of the vibrator and filament heating circuits.

Since the vibrator and filament are energized intermittently only and during the relatively short exposure periods, the amplifier will be called upon to supply relatively small power, resulting in a long life of the batteries 35 and 49 before requiring replacement. The amplifier tube may be of the known miniature or midget type requiring from 1 to 1.5 heating voltage and a plate voltage as low as 25 volts, whereby to result in reduced size and bulk of the amplifier and enabling the unit to be conveniently carried by the photographer in a pocket, carrying bag, or case.

If greater output currents are required, a two or multiple-stage amplifier may be used, or special tubes and circuits such as tetrodes or pentodes may be employed to improve the efficiency in a manner well known to those skilled in the art.

The entire amplifier is mounted in a suitable casing 71 made preferably of molded insulating material such as Bakelite, and connected with the camera through a flexible, elongated member or cord 72 comprising insulated wires corresponding to the conductors 26, 27, 28 and 29 shown in Figure 1. Said cord is provided with suitable plugs 73 and 74 fitting corresponding sockets in the camera 25 and amplifier casing 71, respectively, to enable instant attachment and detachment of the converter or amplifier to and from the camera.

Numeral 75 in Figure 2 represents the operating knob for the volume control resistor (47 according to Figure 1) carrying a dial 76 provided with a scale 77. The latter is arranged to cooperate with a fixed scale 78 applied to the surface of casing 71. Scale 77 may represent exposure times and scale 78 may represent film speeds or vice versa, whereby adjustment to cause an exposure time and film speed used to be opposite each other, will result in a proper consideration in the iris adjustment of the camera. As is understood, the arrangement of the scales should be such that increased exposure time or increased film speed will result in an increase of the amplifier output and vice versa, to ensure proper compensation by a corresponding change of the iris control or adjustment, assuming the iris to be closed by increasing current energizing the moving coil 23.

If automatic operation is not desirable, the amplifier and connecting cord may be discarded and the camera used in the ordinary manner. In the latter case, a separate light meter may be connected to the camera to indicate the current generated by the photovoltaic cell, by using leads 26 and 27, as shown in Figure 1. The brightness indicated by the meter may then be converted into appropriate exposure adjusting values by a converter or calculator suitably combined with the indicator or camera.

Referring to Figure 4, there is shown a modification of the invention, differing from Figure 1 by the mounting of the amplifier in the camera body, such as a reflex camera where the necessary space is usually available, and in the employment of a separate battery unit quickly attachable to or detachable from the camera through a flexible connector, in a manner similar to that shown in Figure 1. There is furthermore shown in Figure 4, a thermionic rectifier or diode 80 having a filament 81 and a plate 82 and being energized by the output of the amplifier 44 through a coupling network comprising a load resistance 83 and coupling condensers 84 and 85. Diode 80 replaces the synchronous rectifier shown in Figure 1. The diode circuit also includes a load resistor 86 by-passed by a filter condenser 87 and serving to supply rectified output current for energizing the iris control device.

The latter is shown to be of modified construction compared with Figure 1, by comprising three separate moving coils 90, 91 and 92 mounted within suitable air gaps of the magnet 24 each arranged to directly drive one of the leaves 12, 13 and 14, respectively. In the example shown, all three moving coils are energized in series by the output current of the diode rectifier. Any other connection may be employed, as is understood. The battery 93 comprising both heating and plate battery units is mounted in a separate casing and connected to the amplifier in a camera through the leads 94, 95 and 96, in a manner similar to that shown in Figure 1 and understood from the above. Other details will be apparent and are readily understood from the foregoing.

As is understood, the converter and amplifier shown may be used in connection with any other type of automatic exposure control system structurally embodied in a camera, i. e., without separation into a unit detachably connected to the camera in the manner shown.

The vibrator in the example shown may be advantageously mounted in an evacuated vessel or inert gas atmosphere such as argon or neon to prevent contact deterioration due to arcing and to insure safe starting and operation. Other well known means, such as arc-suppression condensers, may be provided to improve both the efficiency and reliability of operation, of the converter or amplifier as will be readily understood by those skilled in the art.

If the camera is equipped with a number of exchangeable lenses of different focal length and relative aperture such as wide angle and telescopic lenses in addition to a lens of normal focal length, the different apertures of the various lenses may be taken into account by adjusting the volume or gain of the amplifier in a manner understood from the above. This may be accomplished, in the example shown, by the provision of an additional volume control resistor in the output circuit, such as by the use of an adjustable diode load resistor (86 in Figure 4) or in any other suitable manner.

While I have shown and described a few desirable embodiments of my invention, it is understood that this disclosure is for the purpose of illustration, and that various changes in shape, proportion and arrangement of parts, as well as the substitution of equivalent elements for those herein shown and described, may be made without departing from the spirit and scope of the invention as defined in the appended claims. The specification and drawing are accordingly to be regarded in an illustrative rather than a limiting sense.

I claim:

1. The combination with a portable photographic hand camera comprising a lens, a shutter and an iris diaphragm having adjusting means operable by electric current to control the amount of light passing through said lens; a photoelectric device mounted upon said camera and arranged to produce a photoelectric current proportional to the brightness of a scene being photographed in the picture taking position of said camera; a separately wearable thermionic amplifier forming a unit different from said camera and including cathode heating current and anode current supply means; circuit connecting means including flexible conductor means detachably connectable to said camera, on the one hand, and connected to said amplifier, on the other hand, to operatively interconnect said photoelectric device, said amplifier, and said adjusting means, whereby to control the opening of said diaphragm in accordance with the existing scene brightness; shutter release means upon said camera; an electric switch upon said camera with means to be controlled by said shutter release means to be closed prior to and to be opened after an exposure during operation of said shutter release means; and further circuit connecting means including additional flexible conductor means between said camera and said amplifier unit and connectable with said first connector means, whereby to insert said switch in the cathode heating current circuit of said amplifier.

2. The combination with a portable photographic hand camera comprising a lens, a shutter and an iris diaphragm having adjusting means operable by electric current to control the amount of light passing through said lens; a photoelectric device mounted upon said camera and provided with acceptance angle limiting means to produce a photoelectric current proportional to the brightness of the scene being photographed in the picture taking position of said camera; a separately wearable thermionic amplifier forming a unit different from said camera and including cathode heating current and anode current supply means; circuit connecting means including a flexible cord enclosing conductors connectable to said camera, on the one hand, and connected to said amplifier, on the other hand, to operatively interconnect said photoelectric device, said amplifier, and said adjusting means, whereby to control the opening of said iris diaphragm in accordance with the existing scene brightness; shutter release means upon said camera, an electric switch upon said camera with means to be controlled by said shutter release means, to be closed prior to and to be opened after an exposure during the operation of said shutter release means; and further circuit connections including additional conductor means within said cord connectable with said first mentioned conductors, whereby to insert said switch in the cathode heating current circuit of said amplifier.

3. The combination with a portable photographic hand camera comprising a lens, a shutter and an iris diaphragm having adjusting means operable by direct electric current to control the amount of light passing through said lens; a photovoltaic cell mounted upon said camera and provided with acceptance angle limiting means to produce a photoelectric current proportional to the brightness of the scene being photographed in the picture taking position of said camera; a separately wearable thermionic amplifier forming a unit different from said camera and comprising current interrupting means for converting a direct input current of said amplifier into alternating current suitable for amplification by said amplifier, rectifying means for reconverting the amplified alternating current into direct current and heating current and anode current supply means for said amplifier; circuit connecting means including flexible conductor means detachably connectable to said camera, on the one hand, and connected to said amplifier, on the other hand, whereby to operatively interconnect said photovoltaic cell, said amplifier and said adjusting means, to control the opening of said iris diaphragm in accordance with the existing scene brightness; shutter release means upon said camera; a normally open electric switch upon said camera arranged to be controlled by said shutter release means, to be closed prior to and to be opened after an exposure during the operation of said shutter release means; and further circuit connecting means including additional flexible conductor means between said camera and said amplifier and connectable with said first mentioned conductor means, whereby to insert said switch in the cathode heating current circuit of said amplifier.

4. The combination with a portable photographic hand camera comprising a lens, a shutter and an iris diaphragm having adjusting means operable by direct electric current to control the amount of light passing through said lens; a photovoltaic cell mounted upon said camera and provided with acceptance angle limiting means to produce a photoelectric current proportional to the brightness of a scene being photographed in the picture taking position of said camera; a separately wearable thermionic amplifier forming a unit different from said camera and including cathode heating current and anode current supply means, an electromagnetic self-interrupter energized by said heating current supply means, whereby to convert a direct input current of said amplifier into alternating current suitable for amplification by said amplifier and rectifying means for reconverting the amplified alternating current into direct current; circuit connecting means including flexible conductor means detachably connectable to said camera, on the one hand, and connected to said amplifier, on the other hand, whereby to operatively interconnect said photovoltaic cell, said amplifier, and said adjusting means to control the opening of said iris diaphragm in accordance with the existing scene brightness; shutter release means upon said camera, a normally open electric switch upon said camera arranged to be controlled by said shutter release means, to be closed prior to and to be opened after exposure during operation of said shutter release means; and further circuit connecting means including additional flexible conductor means between said camera and said amplifier and connectable with said first mentioned conductor means, whereby to insert said switch in the circuit of both the cathode heating current and said electromagnetic interrupter.

5. The combination with a portable photographic hand camera comprising a lens, a shutter and an iris diaphragm having adjusting means operable by direct electric current, to control the amount of light passing through said lens; a photovoltaic cell mounted upon said camera and provided with acceptance angle limiting means to produce a photoelectric current proportional to the brightness of a scene being photographed in the picture taking position of said camera; a separately wearable thermionic amplifier forming a unit different from said camera and including heating current and anode current supply means, an electromagnetic self-interrupter energized by said heating current supply means for converting a direct input current of said amplifier into alternating current suitable for amplification by said amplifier and rectifying means for reconverting the amplified alternating current into direct current; circuit connecting means including a flexible cord enclosing conductors detachably connectable to said camera, on the one hand, and connected to said amplifier, on the other hand, whereby to operatively interconnect said photovoltaic cell, said amplifier, and said adjusting means to control the opening of said iris diaphragm in accordance with the existing scene brightness, shutter release means upon said camera; a normally open electric switch upon said camera arranged to be controlled by said shutter release means, to be closed prior to and to be opened after an exposure during the operation of said shutter release means; and further circuit connecting means including additional conductor means within said cord and connectable with said first-mentioned conductors, whereby to insert said switch in the circuit of both the cathode heating current and said electromagnetic interrupter.

6. The combination with a portable photographic hand camera comprising a lens, a shutter and an iris diaphragm having adjusting means operable by direct electric current to control the amount of light passing through said lens; a photovoltaic cell mounted upon said camera and provided with acceptance angle limiting means to produce a photoelectric current proportional to the brightness of a scene being photographed in the picture taking position of said camera; a separately wearable thermionic amplifier forming a unit different from said camera and including cathode heating current and anode current supply means, an electromagnetic self-interrupter having cooperating contacts and energized by said heating current supply means, whereby to convert a direct input current of said amplifier into alternating current suitable for amplification by said amplifier, and a mechanical rectifier having contacts operated by and in synchronism with the contacts of said interrupter, for reconverting the amplified alternating current into direct current; circuit connecting means including flexible conductor means detachably connectable to said camera, on the one hand, and connected to said amplifier, on the other hand, to operatively interconnect said photovoltaic cell, said amplifier and said adjusting means, to control the opening of said iris diaphragm in accordance with the existing scene brightness; shutter release means upon said camera, a normally open electric switch upon said camera arranged to be controlled by said shutter release means, to be closed prior to and to be opened after an exposure during operation of said shutter release means; and further circuit connecting means including additional flexible conductor means between said camera and said amplifier and connectable with said first mentioned conductors, whereby to insert said switch in both the cathode heating current circuit and the circuit of said electromagnetic interrupter.

KARL RATH.